United States Patent
Walker et al.

(10) Patent No.: US 12,131,419 B2
(45) Date of Patent: Oct. 29, 2024

(54) RENDERING IMAGES FOR NON-STANDARD DISPLAY DEVICES

(71) Applicant: Lucasfilm Entertainment Company Ltd., San Francisco, CA (US)

(72) Inventors: Nicholas Walker, San Francisco, CA (US); David Weitzberg, Greenbrae, CA (US); André Mazzone, Mill Valley, CA (US)

(73) Assignee: LUCASFILM ENTERTAINMENT COMPANY LTD, San Francisco, CA (US)

( * ) Notice: Subject to any disclaimer, the term of this patent is extended or adjusted under 35 U.S.C. 154(b) by 0 days.

(21) Appl. No.: 16/917,636

(22) Filed: Jun. 30, 2020

(65) Prior Publication Data

US 2021/0407174 A1    Dec. 30, 2021

(51) Int. Cl.
  *G06T 15/06*  (2011.01)
  *G06T 3/08*   (2024.01)
  *G06T 15/20*  (2011.01)
  *G06T 15/50*  (2011.01)

(52) U.S. Cl.
  CPC ............... *G06T 15/06* (2013.01); *G06T 3/08* (2024.01); *G06T 15/20* (2013.01); *G06T 15/50* (2013.01)

(58) Field of Classification Search
  None
  See application file for complete search history.

(56) References Cited

U.S. PATENT DOCUMENTS

| | | | | |
|---|---|---|---|---|
| 2009/0115783 | A1* | 5/2009 | Eichenlaub | G03B 35/08 345/421 |
| 2009/0244267 | A1* | 10/2009 | Yuan | G06F 3/012 348/51 |
| 2011/0248987 | A1* | 10/2011 | Mitchell | G06T 19/20 345/419 |
| 2014/0104424 | A1* | 4/2014 | Zhang | G06T 7/75 348/148 |
| 2015/0348326 | A1* | 12/2015 | Sanders | H04N 5/275 345/633 |
| 2018/0192042 | A1* | 7/2018 | Stolzberg | H04N 21/4122 |
| 2018/0343428 | A1* | 11/2018 | Lei | G06F 3/013 |
| 2019/0287294 | A1* | 9/2019 | Liu | G06T 15/60 |
| 2020/0145644 | A1* | 5/2020 | Cordes | G06T 7/20 |
| 2020/0366876 | A1* | 11/2020 | Takao | H04N 9/3147 |

* cited by examiner

*Primary Examiner* — Aaron M Richer
(74) *Attorney, Agent, or Firm* — Kilpatrick Townsend & Stockton LLP

(57) ABSTRACT

A method of rendering an image includes receiving information of a virtual camera, including a camera position and a camera orientation defining a virtual screen; receiving information of a target screen, including a target screen position and a target screen orientation defining a plurality of pixels, each respective pixel corresponding to a respective UV coordinate on the target screen; for each respective pixel of the target screen: determining a respective XY coordinate of a corresponding point on the virtual screen based on the camera position, the camera orientation, the target screen position, the target screen orientation, and the respective UV coordinate; tracing one or more rays from the virtual camera through the corresponding point on the virtual screen toward a virtual scene; and estimating a respective color value for the respective pixel based on incoming light from virtual objects in the virtual scene that intersect the one or more rays.

22 Claims, 15 Drawing Sheets

RENDERING IMAGES FOR NON-STANDARD DISPLAY DEVICES

BACKGROUND

In computer graphics, ray tracing is a rendering technique for generating an image by tracing the path of light as pixels in an image plane and simulating the effects of its encounters with virtual objects. Ray tracing is capable of producing a higher degree of visual realism than other rendering techniques (e.g., scanline rendering methods), but at a greater computational cost. Rendering by ray tracing for certain types of display screens (e.g., large screens, oddly shaped screens, and the like) can present particular challenges. Therefore, improved rendering techniques are needed.

SUMMARY

According to some embodiments, a method of rendering an image by ray tracing includes receiving information of a virtual camera. The information of the virtual camera includes a camera position and a camera orientation, which define a virtual screen perpendicular to an optical axis of the virtual camera. The method further includes receiving information of a target screen. The information of the target screen includes a target screen position and a target screen orientation. The target screen defines a plurality of pixels. Each respective pixel corresponds to a respective UV coordinate on the target screen. The method further includes, for each respective pixel of the plurality of pixels of the target screen: determining a respective XY coordinate of a corresponding point on the virtual screen based on the camera position, the camera orientation, the target screen position, the target screen orientation, and the respective UV coordinate; tracing one or more rays from the virtual camera through the corresponding point on the virtual screen at the respective XY coordinate toward a virtual scene; and estimating a respective color value for the respective pixel based on incoming light from virtual objects in the virtual scene that intersect the one or more rays.

According to some embodiments, a computer product includes a non-transitory computer readable medium storing a plurality of instructions that, when executed, control a computer system to render an image by ray tracing. The instructions include receiving information of a virtual camera. The information of the virtual camera includes a camera position and a camera orientation, which define a virtual screen perpendicular to an optical axis of the virtual camera. The instructions further include receiving information of a target screen. The information of the target screen includes a target screen position and a target screen orientation. The target screen defines a plurality of pixels. Each respective pixel corresponds to a respective UV coordinate on the target screen. The instructions further include, for each respective pixel of the plurality of pixels of the target screen: determining a respective XY coordinate of a corresponding point on the virtual screen based on the camera position, the camera orientation, the target screen position, the target screen orientation, and the respective UV coordinate; tracing one or more rays from the virtual camera through the corresponding point on the virtual screen at the respective XY coordinate toward a virtual scene; and estimating a respective color value for the respective pixel based on incoming light from virtual objects in the virtual scene that intersect the one or more rays.

According to some embodiments, a computer system includes one or more processors, and a non-transitory computer readable medium storing a plurality of instructions that, when executed, control the one or more processors to render an image by ray tracing. The instructions include receiving information of a virtual camera. The information of the virtual camera includes a camera position and a camera orientation, which define a virtual screen perpendicular to an optical axis of the virtual camera. The instructions further include receiving information of a target screen. The information of the target screen includes a target screen position and a target screen orientation. The target screen defines a plurality of pixels. Each respective pixel corresponds to a respective UV coordinate on the target screen. The instructions further include, for each respective pixel of the plurality of pixels of the target screen: determining a respective XY coordinate of a corresponding point on the virtual screen based on the camera position, the camera orientation, the target screen position, the target screen orientation, and the respective UV coordinate; tracing one or more rays from the virtual camera through the corresponding point on the virtual screen at the respective XY coordinate toward a virtual scene; and estimating a respective color value for the respective pixel based on incoming light from virtual objects in the virtual scene that intersect the one or more rays.

DETAILED DESCRIPTION

Figure 1:
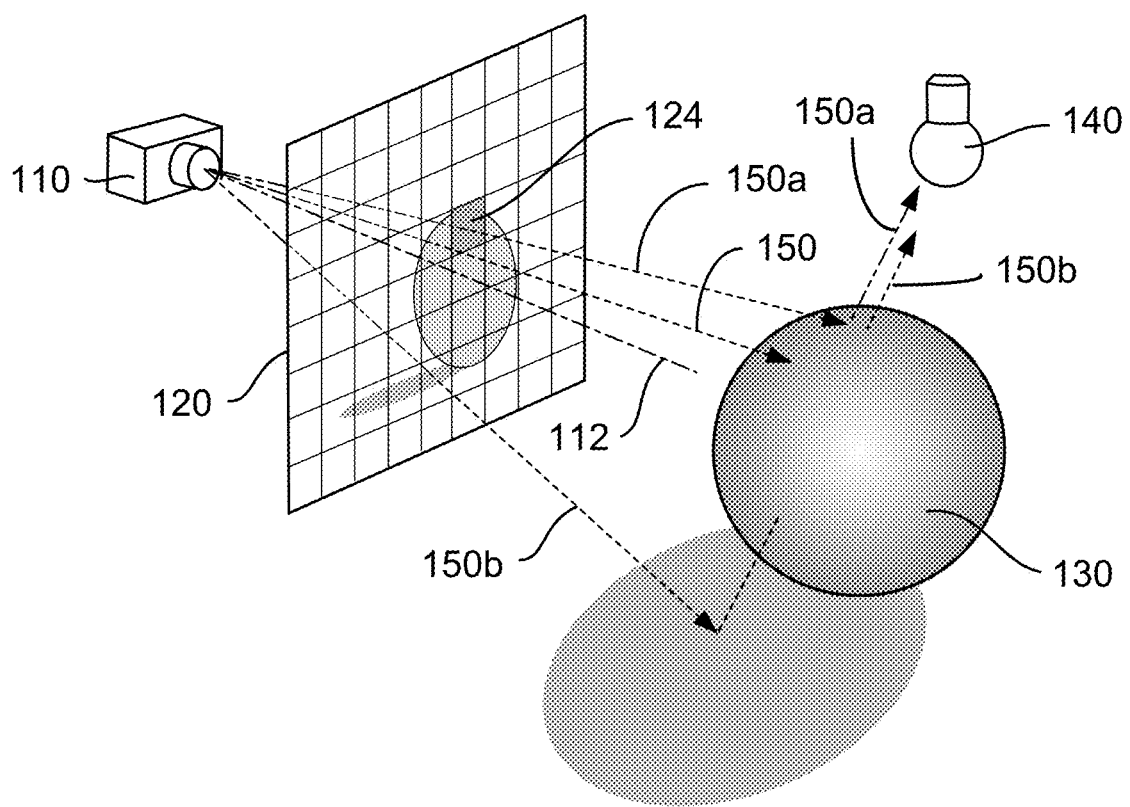
FIG. 1 illustrates an example of rendering by ray tracing.

Ray tracing can involve tracing a path from an imaginary eye (or a virtual camera) through each pixel in a virtual screen, and calculating the color of the object visible through the pixel. FIG. 1 illustrates a ray tracing example. In this example, the virtual object 130 is a ball, which is in the field of view of a virtual camera 110. A virtual screen 120 is in front of the virtual camera 110. In this example, the virtual screen 120 is rectangular and is substantially perpendicular to the optical axis 112 of the virtual camera 110. For example, the virtual screen 120 can be a viewing frustum of the virtual camera 110. The virtual screen 120 includes regular grids of pixels 124.

To render an image of the virtual scene on the virtual screen 120, rays 150 can be launched from the virtual camera 110 through the pixels 124 of the virtual screen 120 toward the virtual scene. Some rays (e.g., the ray 150*a*) can be bounced off the surfaces of some objects (e.g., the surface of the ball 130) and toward light sources (e.g., the light source 140). Color values can be estimated for the pixels, for example, based on the material properties of the objects at the points of intersection. Some rays (e.g., the ray 150*b*) bounced off a surface of an object can be blocked by other objects (e.g., the ball 130) toward a light source (e.g., the light source 140), resulting in a shadow on the surface.

In some cases, each ray can be tested for intersection with some subset of all the virtual objects in the virtual scene. Once the nearest virtual object has been identified, the algorithm can estimate the incoming light at the point of intersection, examine the material properties of the virtual object, and combine this information to calculate the final color of the pixel.

Figure 2A:
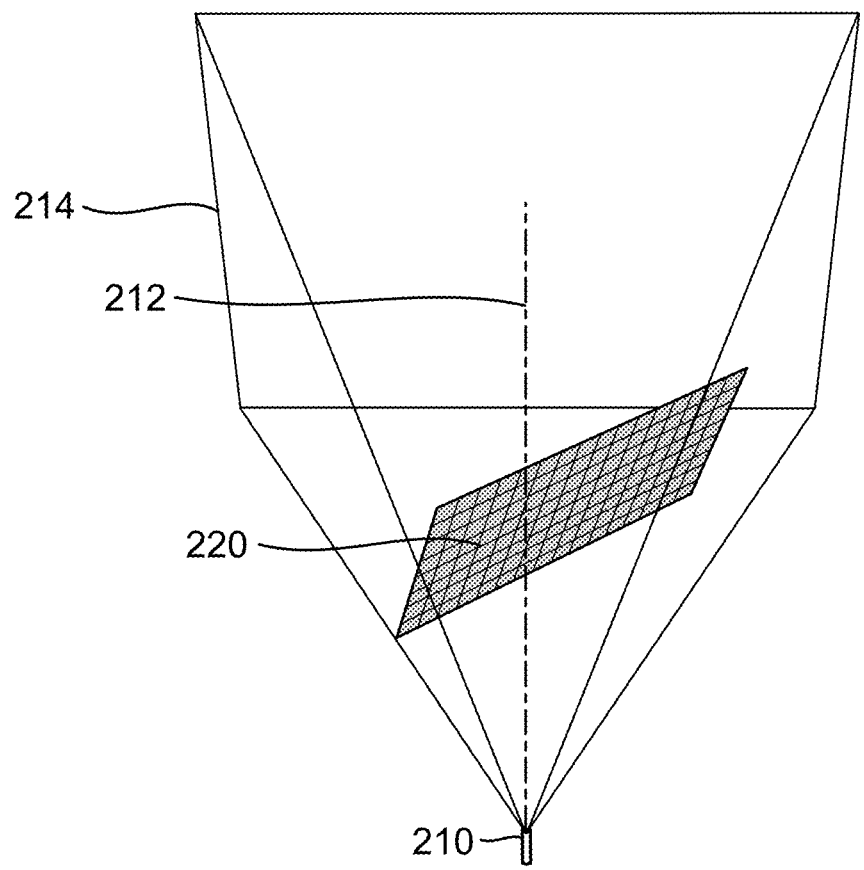
FIGS. 2A and 2B illustrate an example of a virtual screen that is not perpendicular to the optical axis of a virtual camera.
Figure 2B:
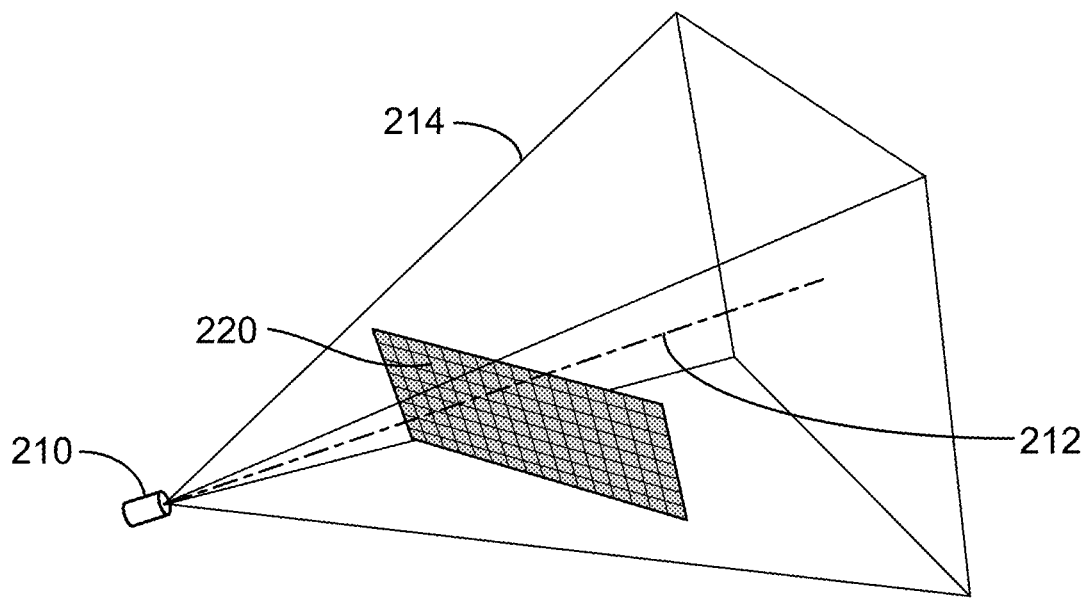

In some situations, it can be necessary or advantageous to have a virtual screen that is not rectangular and/or not perpendicular to the optical axis of the virtual camera. FIGS. 2A and 2B illustrate an example. FIG. 2A shows a virtual screen 220 as looking straight ahead into a viewing frustum 214 (e.g., field of view) of a virtual camera 210; and FIG. 2B shows a perspective view. As illustrated, the virtual screen 220 is not perpendicular to the optical axis 212 of the virtual camera 210. Herein, the term non-standard display screens can refer to oddly shaped and/or oddly oriented display screens, as well as curved display screens and large-sized display screens.

Figure 3A:
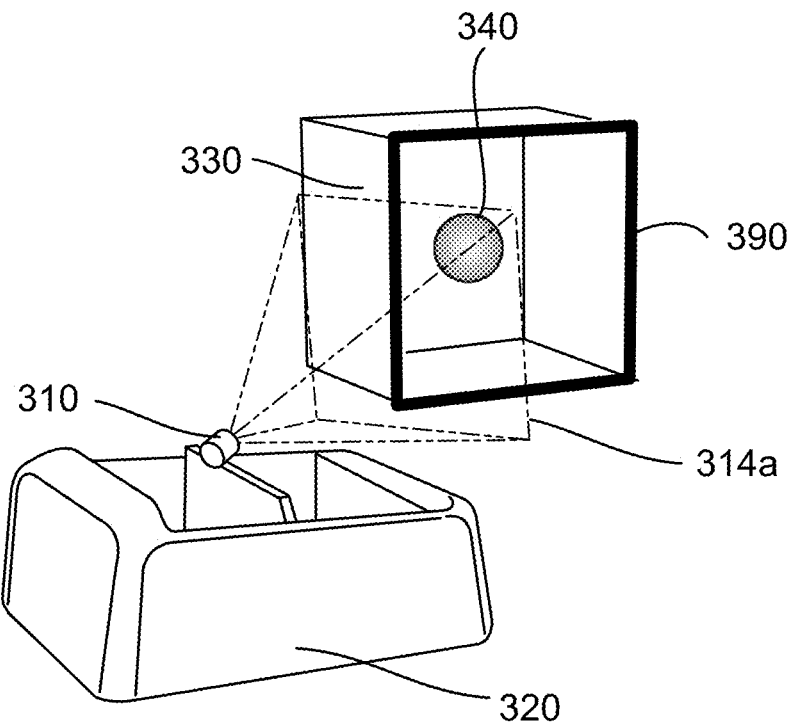
FIGS. 3A and 3B illustrate an example of rendering images to be viewed from moving eye points, in which non-standard display screens can be encountered.
Figure 3B:
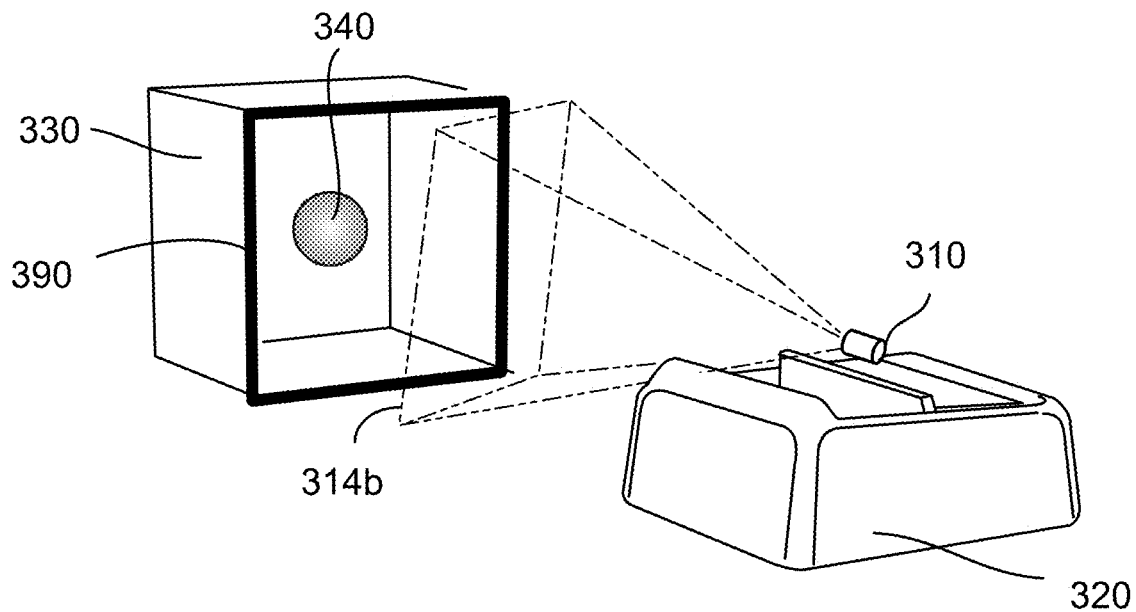

Non-standard screens can be encountered, for example, in renderings to be viewed from moving eye-points (e.g., in three-dimensional or 3D rides in theme parks, immersive environments used in virtual content production, etc.). FIGS. 3A and 3B illustrate an example. A rider is riding in a vehicle 320, which is moving passed a screen 390. FIG. 3A shows the position of the vehicle 320 at a first instance of time before it past the screen 390; and FIG. 3B shows the position of the vehicle 320 at a second instance of time after it passed the screen 390. One wishes to render images that can be mapped onto the screen 390 that can give the rider the illusion of a room 330 behind the screen 390 (illustrated as a box with a ball 340 inside).

To provide the rider a more realistic 3D experience, the image can be rendered from a moving point of perspective to match the movement of the vehicle 320 (and the rider). A virtual camera 310 can be placed at where the rider is. The virtual camera 310 can remain pointed at the screen 390 as the vehicle 320 moves past the screen 390. For example, at the first instance of time, the viewing frustum 314*a* of the virtual camera 310 is directed at the screen 390 at a certain angle with respect to the screen 390, as illustrated in FIG. 3A; and at the second instance of time, the viewing frustum 314*b* of the virtual camera 310 is directed at the screen 390 at a different angle with respect to the screen 390 so as to follow the movement of the virtual camera 390, as illustrated in FIG. 3B. Such a virtual camera can be referred to herein as an "eye-point camera."

Figure 4A:
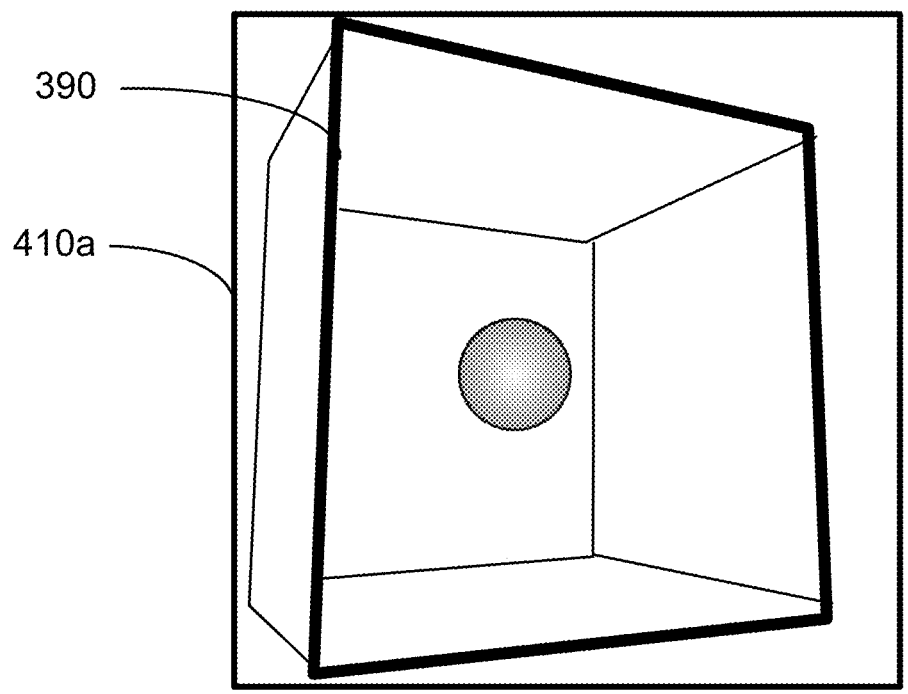
FIGS. 4A and 4B illustrate virtual screens for an eye-point camera that can be used for rendering images in the example illustrated in FIGS. 3A and 3B.
Figure 4B:
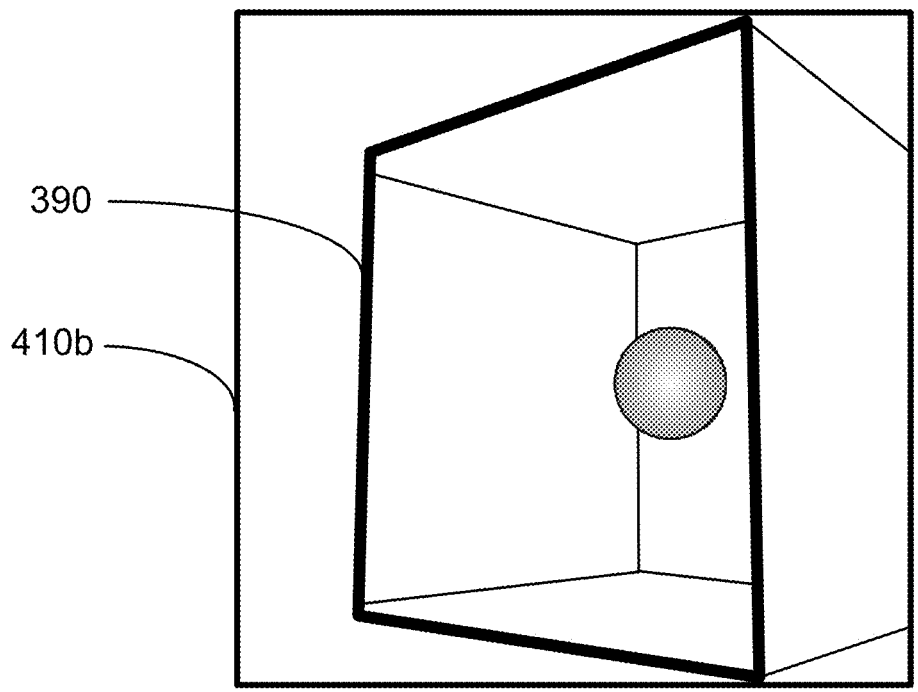

Conventionally, for a non-standard display screen, one may need to render an image on an oversized virtual screen that keeps the full display screen in-frame. FIGS. 4A and 4B illustrate two virtual screens 410*a* and 410*b* that can be used for rendering images in the example illustrated in FIGS. 3A and 3B, respectively. As illustrated in FIG. 4A, the virtual screen 410*a* is large enough to include the entire display screen 390 as viewed from the eye-point camera 310 at the first instance of time as shown in FIG. 3A. In other words, the field of view of the virtual camera 310 needs to be wide enough to encompass the entire display screen 390. Similarly, as illustrated in FIG. 4B, the virtual screen 410*b* is large enough to include the entire display screen 390 as viewed from the eye-point camera 310 at the second instance of time as shown in FIG. 3B. The images rendered on the virtual screen 410*a* and 410*b* can then be projected onto the display screen 390. The eye-point camera 310 can be reused as a projector for projecting the images onto the display screen 390. Alternatively or additionally, the rendered images can also be displayed on a light-emitting diode (LED) display screen or a liquid crystal display (LCD) screen.

Figure 5A:
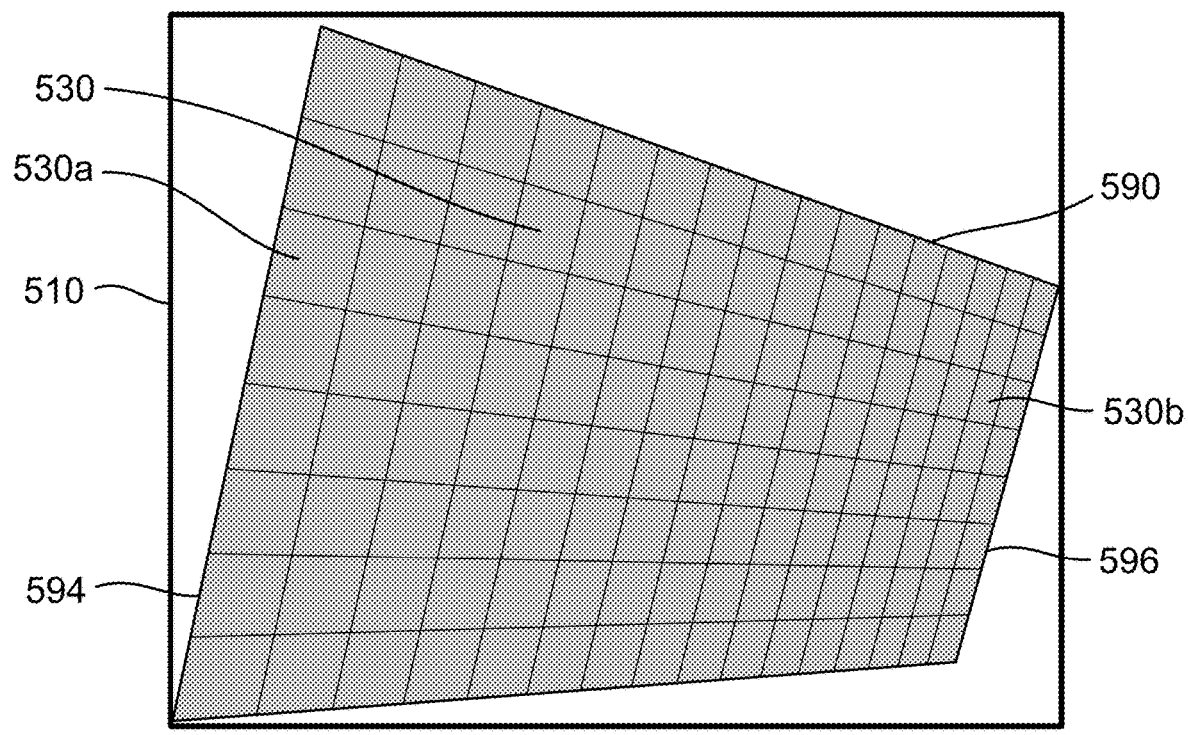
FIGS. 5A-5C illustrate a conventional method of rendering an image for a non-standard display screen.
Figure 5B:
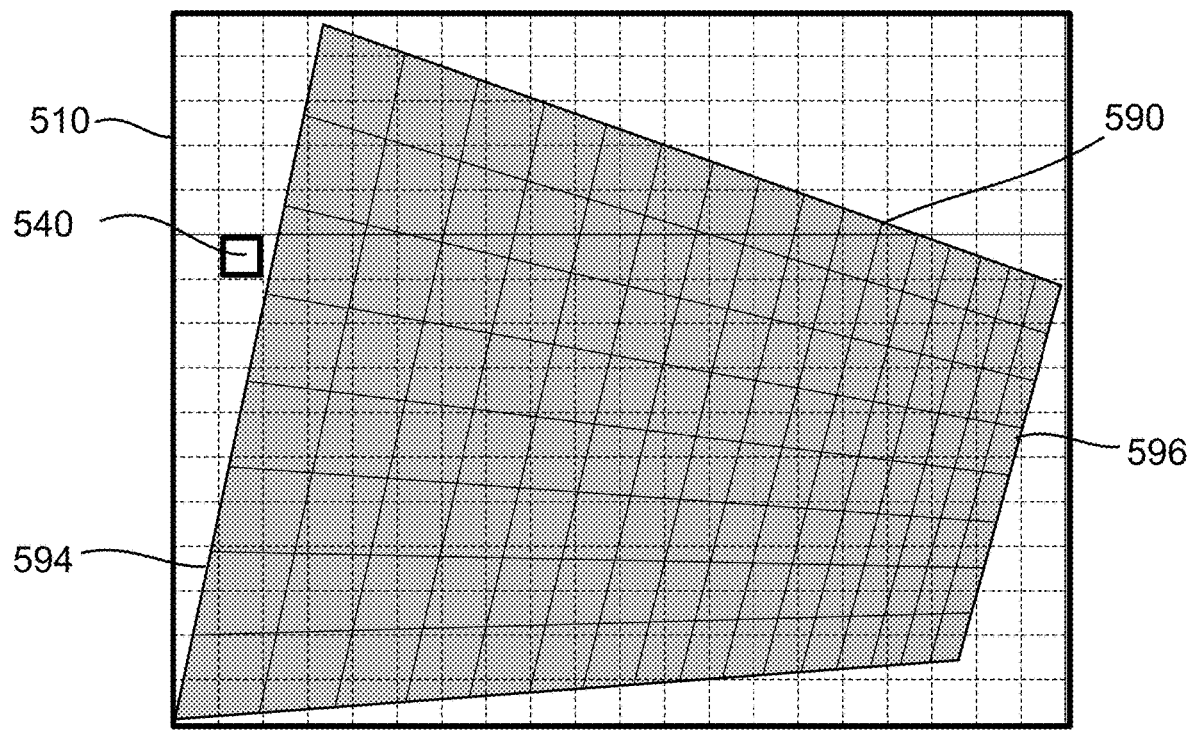
Figure 5C:
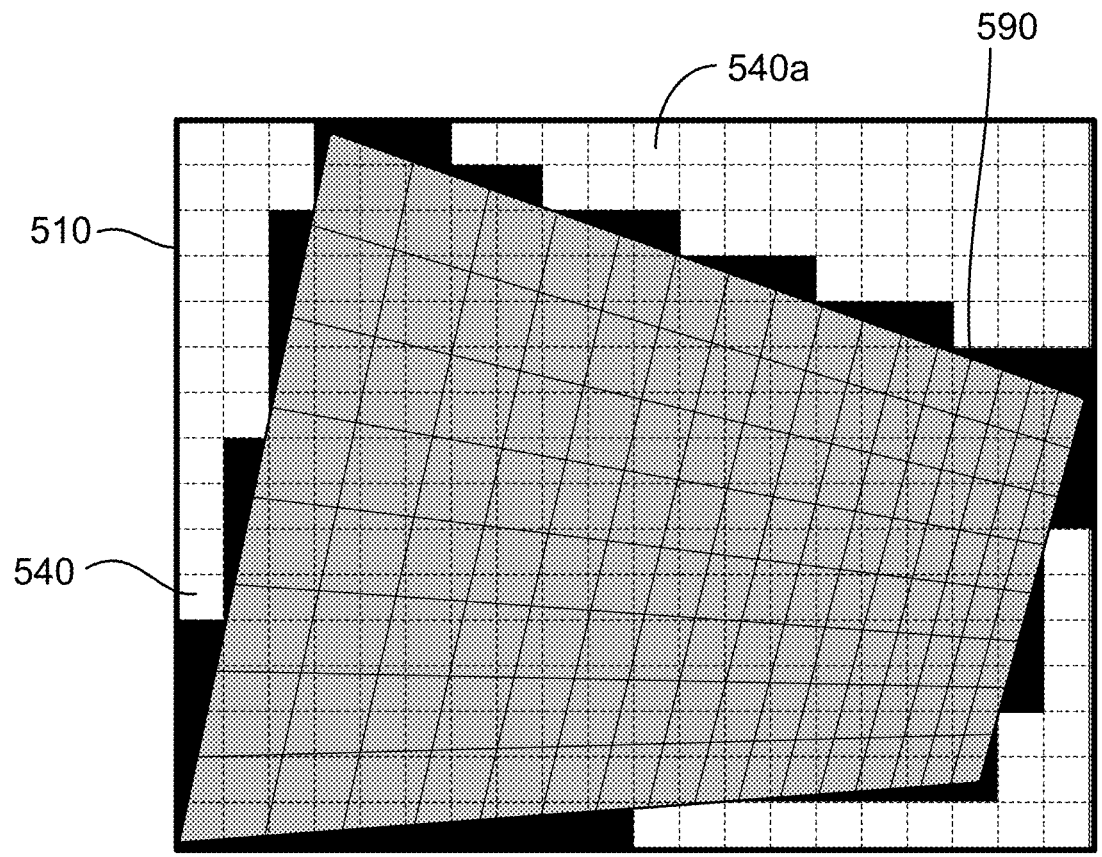

FIGS. 5A-5C illustrate a conventional method of rendering for a non-standard display screen 590. Referring to FIG. 5A, the display screen 590 can be similar to the display screen 390 illustrated in FIG. 4A, as seen from an eye-point camera. One side 594 of the display screen 590 can be closer to the eye-point camera than the other side 596 of the display screen 590. The grids represent the native pixels 530 of the display screen 590. The native pixels will be used to present the final image. As illustrated in FIG. 5A, the native pixels 530 adjacent the side 594 that is closer to the eye-point camera (e.g., the native pixel 530*a*) can appear to be larger than those native pixels 530 adjacent the side 596 that is farther away from the camera (e.g., the native pixel 530*b*).

Referring to FIG. 5B, a rectangular virtual screen 510 that is large enough to include the entire display screen 590 can be used for rendering. The grids in dashed lines represent the pixels 540 of the virtual screen 510 for rendering. The pixels 540 of the virtual screen 510 can be referred to herein as "virtual pixels." As illustrated, the size of the virtual pixels 540 is usually uniform across the virtual screen 510 (e.g., the grids are regularly spaced). In order to achieve a certain desirable spatial resolution at the far side 596 of the display screen 590, the size of each virtual pixel 540 can be selected to be approximately equal to the size of a native pixel adjacent the far side 596 of the display screen 590 (e.g., the native pixel 530*b*). As a result, a native pixel 530 adjacent the near side 594 of the display screen 590 (e.g., the native pixel 530*a*) can include two or more virtual pixels 540 (e.g., as many as four virtual pixels 540). Thus, when projecting the rendered image onto the native pixels 530 of the display screen 590, the color values of multiple virtual pixels 540 can need to be combined into a single color value for some of the native pixels 530. Therefore, one can need to render more pixels than necessary in order to achieve a desired resolution for all native pixels 530.

Referring to FIG. 5C, since the virtual screen 510 is oversized in order to keep the entire display screen 590 in-frame, some virtual pixels 540 (e.g., the virtual pixel 540*a*) can fall outside the display screen 590. Thus, the rendering for those virtual pixels 540 that fall outside the display screen 590 will not be projected onto the display screen 590 and are wasted. In addition, when the rendered image is projected onto the display screen 590, the virtual pixels 540 would need to be resampled onto the native pixels 530 of the display screen 590. Because of the possible mismatch between the virtual pixels 540 and the native pixels 530, some image fidelity can be lost in the resampling process. Therefore, conventional methods of rendering for a display screen that has an arbitrary shape and/or an arbitrary orientation can be less than ideal.

Figure 6:
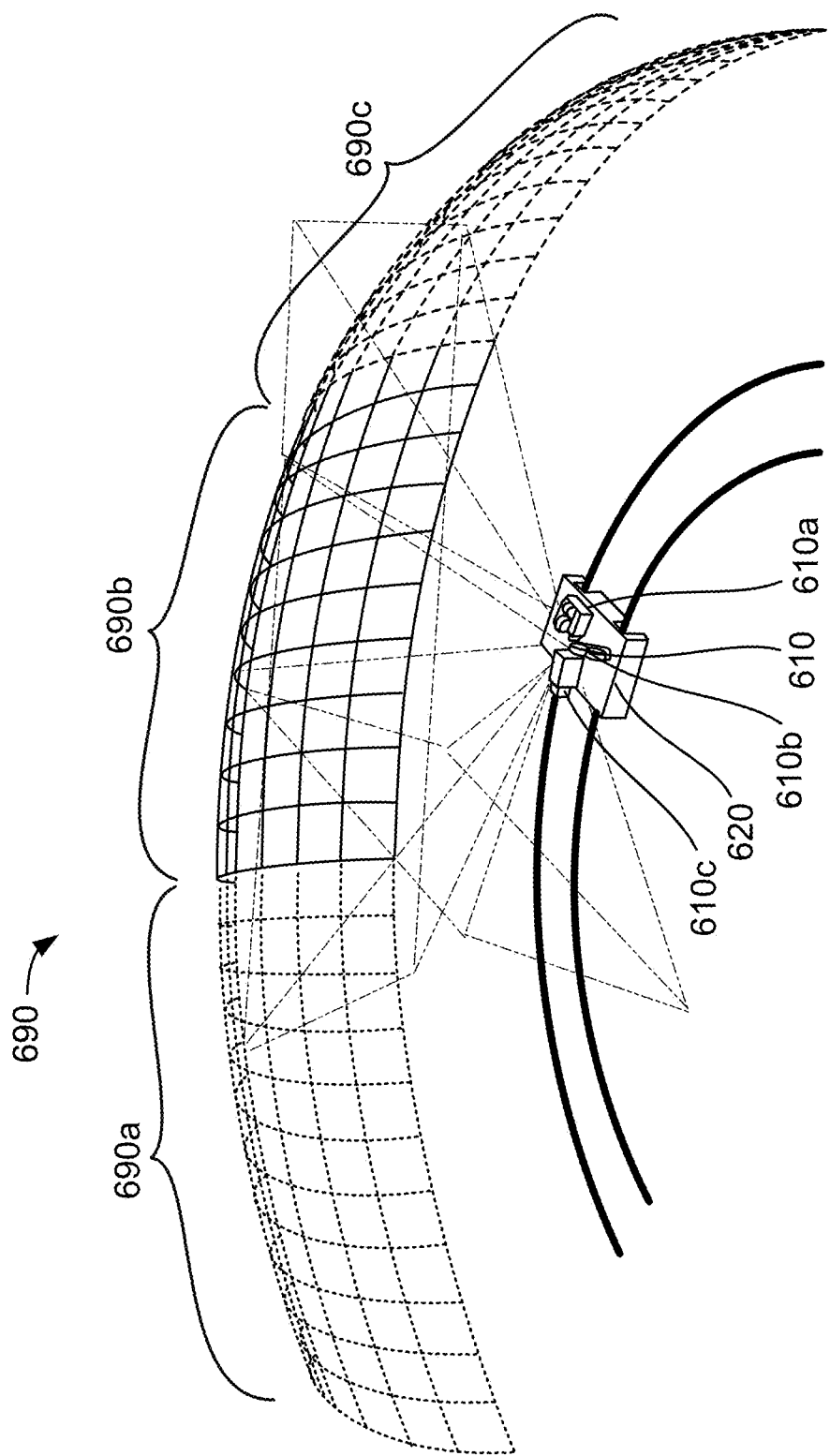
FIG. 6 illustrates another example in which a non-standard display screen can be encountered.

FIG. 6 illustrates another example in which non-standard display screens can be encountered. Here, a vehicle 620 with a rider in it is moving past a large dome display screen 690 (e.g., in a theme park ride). The dome display screen 690 can wrap around the rider for as much as 160 degrees or more. In addition, the dome display screen 690 can be curved. Because the dome display screen 690 is so large, conventional methods of rendering for the dome display screen 690 can need to divide the dome display screen 690 into multiple sections and use multiple eye-point cameras. For instance, in the example illustrated in FIG. 6, the dome display screen 690 is divided into three sections 690a, 690b, and 690c. Three eye-point cameras 610a, 610b, and 610c can be used. A first camera 610a can be pointed toward the first section 690a; a second camera 610b can be pointed toward the second section 690b; and a third camera 610c can be pointed toward the third section 690c.

Figure 7A:
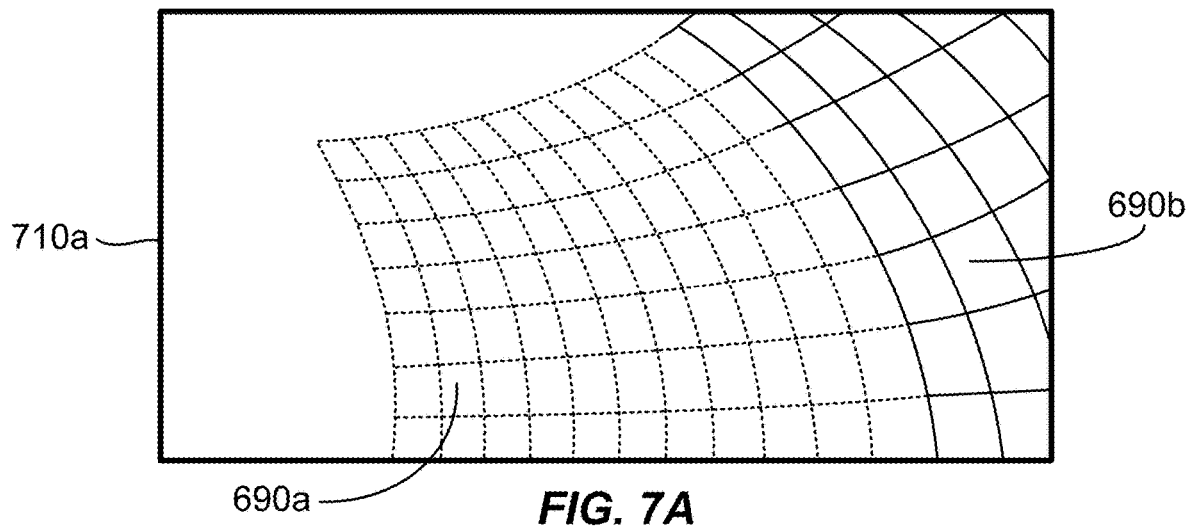
FIGS. 7A-7C show the three sections of the dome display screen shown in FIG. 6, as seen by each respective camera.
Figure 7B:
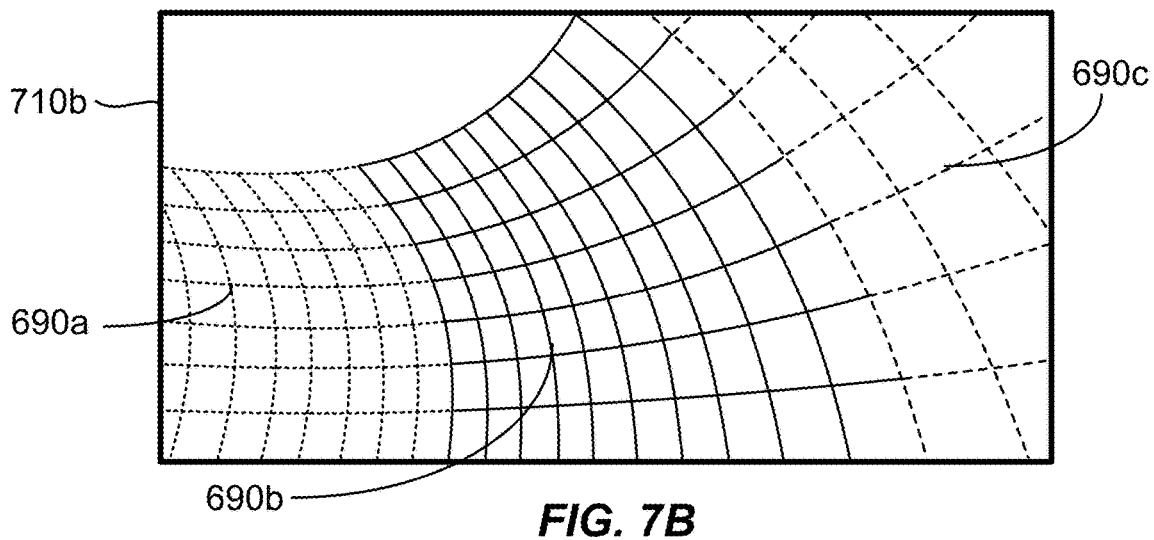
Figure 7C:
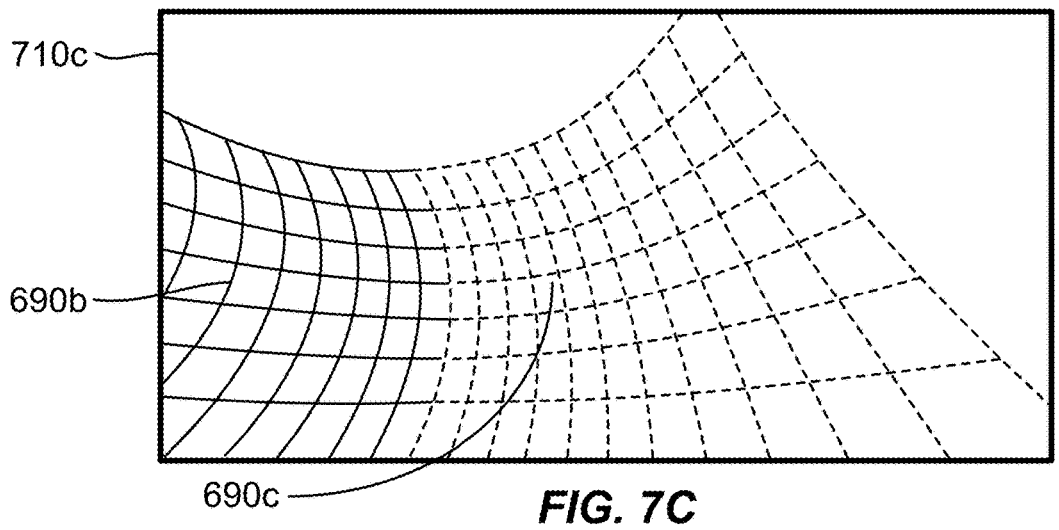

FIGS. 7A-7C show the three sections 690a, 690b, and 690c of the dome display screen 690, respectively, as seen by each respective camera 610a, 610b, or 610c (part of the neighboring section(s) are also shown). As discussed above, to render an image for each section of the dome display screen 690, each of the virtual screens 710a, 710b, and 710c can need to be oversized to keep the entirety of each section in-frame. Rendering for those virtual pixels that fall outside the dome display screen 690 can be wasted. In this example, there can also be issues of blending the images of adjacent sections. For example, what is filling top-to-bottom of one section can be only a small vertical slice of the next section. In some cases, three cameras may not be enough to cover the entire viewing area, and as many as six cameras or more can be used, with three cameras across the top and three cameras across the bottom.

Figure 8:
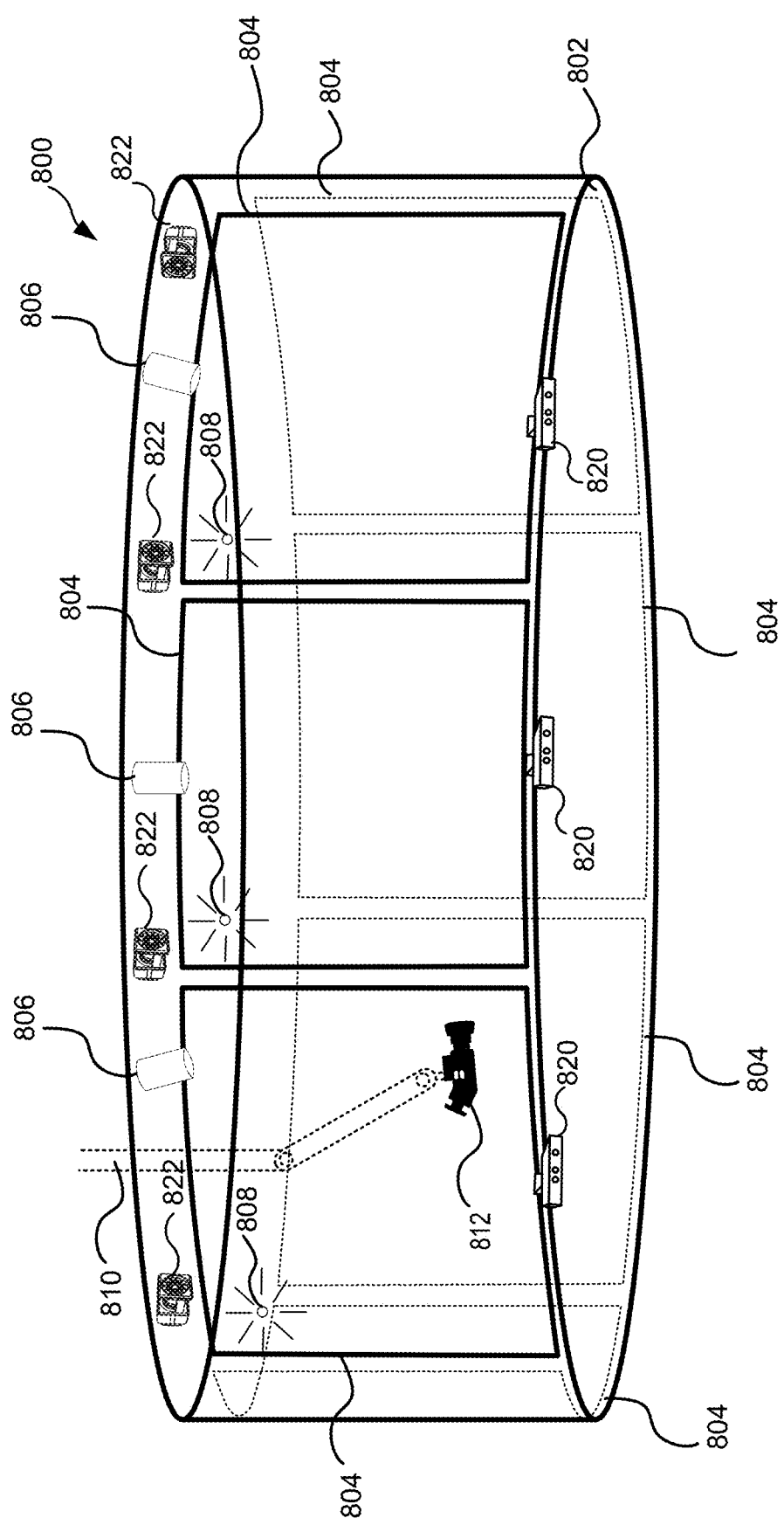
FIGS. 8 and 9 illustrate simplified immersive content production systems.
Figure 9:
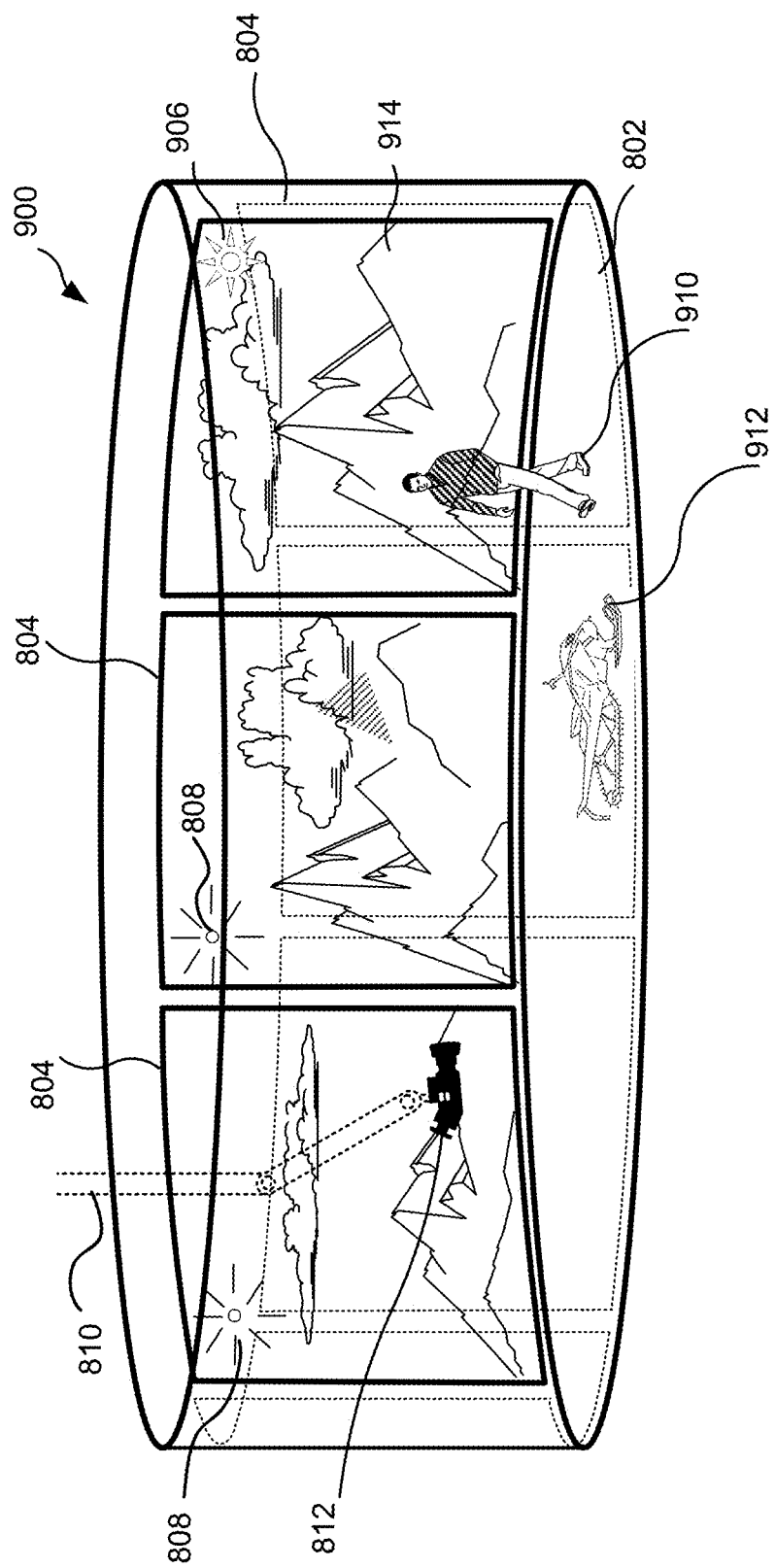

FIGS. 8 and 9 illustrate a further example in which non-standard display screens can be encountered. FIG. 8 is a simplified illustration of an immersive content production system 800. The immersive content production system 800 can include a performance area 802 that is partially or completely surrounded by an image displays 804 (sometimes referred to herein as just "displays"). The content production system 800 can obtain virtual environment content and display the virtual environment content on the displays 804.

The performance area 802 can be, for example, a movie or television set, a stage, a stadium, a park, or the like. In one aspect, the immersive content production system 800 presents images in real-time or at interactive frame rates to users of the content production system (e.g., performers within performance area 802). Since the displays 804 surround or partially surround the performance area 802, the content production system 800 can create an immersive environment (sometimes referred to as an immersive "cave" or immersive "walls") for performances that take place within the performance area. In this way, an actor or actress performing within the performance area 802 can appear to be in the virtual environment.

The displays 804 are light emitting diode (LED) display screens or liquid crystal display (LCD) display screens. For example, the performance area 802 can include one or more walls of LED or LCD displays 804 enclosing the performance area 802. Alternatively, the performance area 802 can be partially or completely surrounded by projector screens and a set of projectors can be configured to project images on the projector screens. The performance area 802 can be surrounded by a combination of LED display screens, LCD display screens and/or projector screens.

In some cases, the displays can be, for example, 20-40 feet tall and the performance area 802 can be, for example, between 50-100 feet in diameter. Other sizes for the displays and the performance area are also possible. The displays 804 can include multiple displays 804 that are generally fixed in position and mostly surround the performance area along with additional moveable or mobile displays 804 that can be moved into positions that create an immersive environment that extends completely or almost completely (i.e., 300-360 degrees) around performance area 802. As an example, the fixed position displays 804 can extend approximately 270 degrees around performance area 802 while moveable displays 804 can be used to augment the fixed position displays to further extend the immersive environment up to 320 degrees or up to 360 degrees around the performance area. Additionally, while not shown in FIG. 8, the content production system 800 can further include one or more displays 804 as a ceiling on performance area 802 and/or as part of the floor of the performance area. Also, while for ease of illustration, the displays 804 are shown in FIG. 8 as having a small space or gap 805 between them, the displays 804 can be installed in the immersive environment 800 as to be seamless with less than a threshold distance or even no space between adjacent displays.

A taking camera 812 can be attached to a rig 810 and can be aimed at the performance area 802 to capture the performance of a performer as well as the virtual environment displayed by the displays 804. Sensors can be used to determine the position and orientation of the taking camera during a performance. For example, GPS based sensors (not shown) can be attached to the taking camera to determine its position within or relative to the performance area. As another example, other cameras (e.g., motion capture cameras 822 discussed below) can be directed at the taking camera configured to capture the performance and one or more markers can be attached to the taking camera. During a performance, the other cameras can capture images of the taking camera as the taking camera is moved and/or oriented during the performance. The production system can use the images captured of the taking camera to determine the movement and orientation of the taking camera during the performance. Such information can be used to support the content production process. For example, such information regarding the orientation and movement of the taking camera can be used to determine the distance of the taking camera from the performer over a performance. Based on the orientation and movement (and other attributes such as lens aperture and focal length) of the taking camera, the content production system can adjust the virtual environment displayed by the immersive cave or walls in real-time or at interactive frame rates to correspond to orientation and position of the taking camera. In this way, images of the virtual environment can be perspective-correct over a performance of the performer.

In some cases, the immersive cave or walls can include one more lighting elements to provide lighting for performance area 802. For example, the immersive cave or walls can include supplemental LED lights 806 separate from displays 804 that can light the performance area 802 (including the performer) and create various desired lighting effects. Thus, the lights 806 can include the ability to project lighting levels of different intensities and project such light from different locations around the stage. In some cases, the additional LED lights 806 can be controlled during a performance in order to change the intensity of the lighting of performance area 802 (including the performer).

In some cases, the additional lighting elements can be created within one or more portions of the various displays 804 that create the virtual environment. For example, instead of depicting the virtual environment in a portion of one or more of the displays 804 surrounding the performance area, that portion of the display 804 can simulate an LED light 808 that illuminates the performance area. The content production system can include multiple simulated lights 808 the location of each of which on the displays 804 can be selected in order to achieve a desired lighting effect. The selection and placement of the simulated lights 808 can be made by a director, lighting technician or other user of content production system 800 prior to a performance taking place within performance area 802 and being filmed by taking camera 812, but the number and location of the simulated lights can be readily adjusted at any time during the performance.

Since each simulated light 808 is created by the displays 804 and are thus part of the displays 804, such simulated lights are sometimes referred to as "embedded lights" or "virtual lights". The simulated lights 808 can be in addition to or instead of the supplemental lights, such as lights 806. Thus, in some cases, the immersive content system 800 includes the simulated lights 808 without any lights 806. Additionally, in some cases the taking camera(s) and/or the associated camera rigs capturing images of the performance area do not include any attached lights. For example, in some cases the taking camera 812 used to capture action within the performance area 802 does not include a ring of LED lights or other form of light for illuminating the performance area that might otherwise be used with such cameras.

In some cases, content production system 800 can further include one or more depth sensors 820 and/or one or more motion capture cameras 822. During a performance performed within the performance area 802, the content production system 800 can detect the motion and/or positioning of one or more performers within the performance area. Such detection can be based on markers or sensors worn by a performer as well as by depth and/or other motion detection sensors 820 and/or by motion capture cameras 822. For example, an array of depth sensors 820 can be positioned in proximity to and directed at the performance area 802. For instance, the depth sensors 820 can surround the perimeter of the performance area. In some cases, the depth sensors 820 measure the depth of different parts of a performer in performance area 802 over the duration of a performance. The depth information can then be stored and used by the content production system to determine the positioning of the performer over the course of the performance.

The depth sensors 820 can include a motion-sensing input device with a depth sensor 820. The depth sensor 820 can include a monochrome complementary metal-oxide semiconductor (CMOS) sensor and infrared projector. The infrared projector can project infrared light throughout the first performance area 802, and the CMOS sensor can measure the distance of each point of reflected infrared (IR) radiation in the performance area 802 by measuring a time it takes for the emitted infrared light to return to the CMOS sensor. Software in the depth sensors 820 can process the IR information received from the depth sensor 820 and use an artificial intelligence machine-learning algorithm to map the visual data and create three-dimensional (3-D) depth models of solid objects in the first performance area 802. For example, the one or more depth sensors 820 can receive emitted infrared radiation to generate 3-D depth models of a performer, along with the floor, walls, and/or ceiling of the first performance area 802. In one test example, the first performance area 802 was surrounded by six to eight Kinect® cameras to capture depth information of objects and performers in the first performance area 802.

The motion cameras 822 can be part of a motion capture system that can track the movement of performers or objects within system 800. In some instances, the motion cameras 822 can be used to track the movement of the taking camera 812 and provide a location of the taking camera to content production system 800 as part of the process that determines what portion of the displays 804 are rendered from the tracked position of and the perspective of the taking camera.

FIG. 9 is a simplified illustration of an immersive content production system 900 that can be similar or identical to the immersive content production system 800 and thus includes many or all of the same components as described with respect to FIG. 8. As shown in FIG. 9, the content production system 900 includes performance area 802, displays 804, simulated lights 808 and a taking camera 812 attached to rig 810, but does not include depth sensors 820 or motion cameras 822.

A performer 910 is also shown within performance area 802 and the performance area can include one or more props 912 (e.g., the snowmobile depicted in FIG. 9.). Scenery images 914 of the virtual environment can be presented on the displays 804 to generate the immersive environment in which performer 910 can conduct his or her performance (e.g., act out a scene in a movie being produced). In some cases, the scenery images 914 can be seamlessly presented across several displays 804 as described with respect to FIG. 8. Scenery images 914 can include one or more virtual light sources 906 that can be, for example, an image of a sun, a moon, stars, street lights, or other natural or manmade light sources displayed in the scenery images 914.

Scenery images 914 can also provide background for the video content captured by a taking camera 812 (e.g., a visible light camera). The taking camera 812 can capture a view of performance area 902 from a single perspective. In some cases, the taking camera 812 can be stationary, while in other cases, the taking camera 812 can be mounted to a track 810 that can move the taking camera during the performance.

In some cases, perspective-correct images (as rendered from the tracked position and perspective of taking camera 812) can be generated and displayed on portions of the surrounding image display walls that are within the field of view (i.e., the frustum) of the taking camera. Areas of the displays 804 outside the field of view of taking camera 812 can be displayed according to a global view perspective.

According to some embodiments, rendering can be performed directly in the native image space of a display screen. The new rendering techniques can eliminate certain intermediate steps (e.g., resampling from the virtual screen to the display screen, stitching together multiple sections of the display screen, and the like), save rendering cycles, eliminate wasteful renderings on unused pixels, and prevent generational losses (e.g., possible loss of some image fidelity in the resampling process). Therefore, the new rendering techniques can afford the ability to create cheaper, faster, and higher-quality images, especially for non-standard display screens.

According to the new rendering techniques, a ray-tracing renderer is programmed to account for the geometry, the UV mapping, and the desired pixel resolution of the target screen onto which a rendered image can be projected. The ray-tracing renderer can use this information to perform ray tracing by tracing one ray per pixel (or several rays per pixel) in the native image space of the target screen.

Figure 10A:
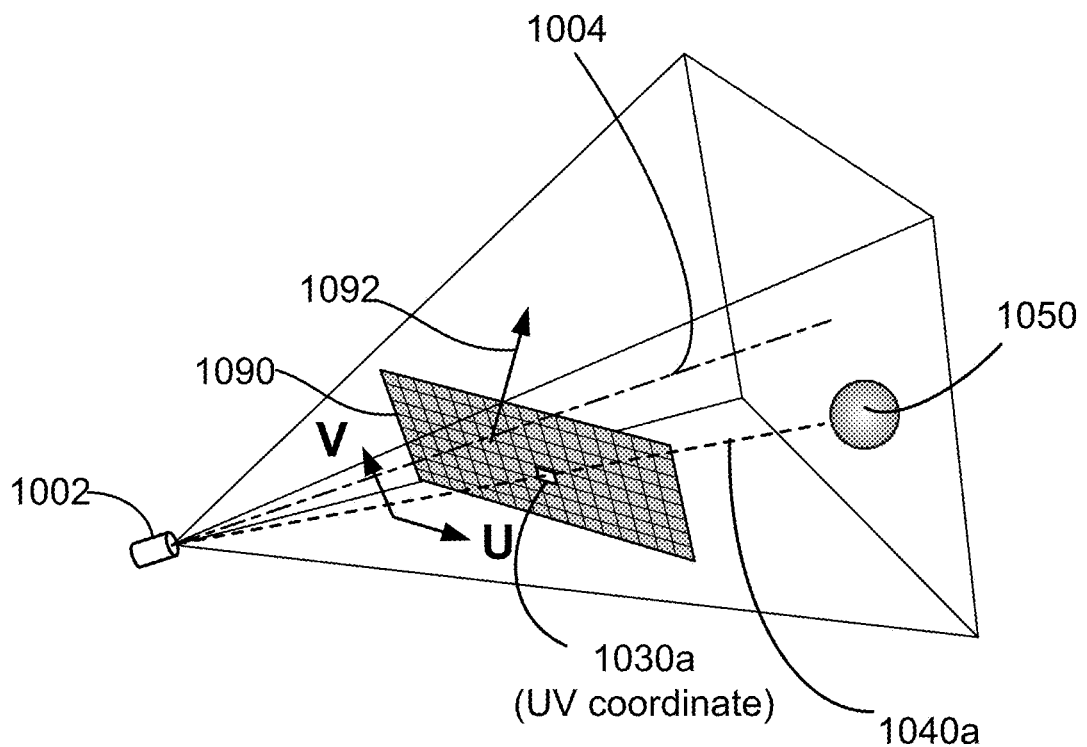
FIGS. 10A and 10B illustrate a method of rendering an image by ray tracing for a non-standard display screen according to some embodiments.
Figure 10B:
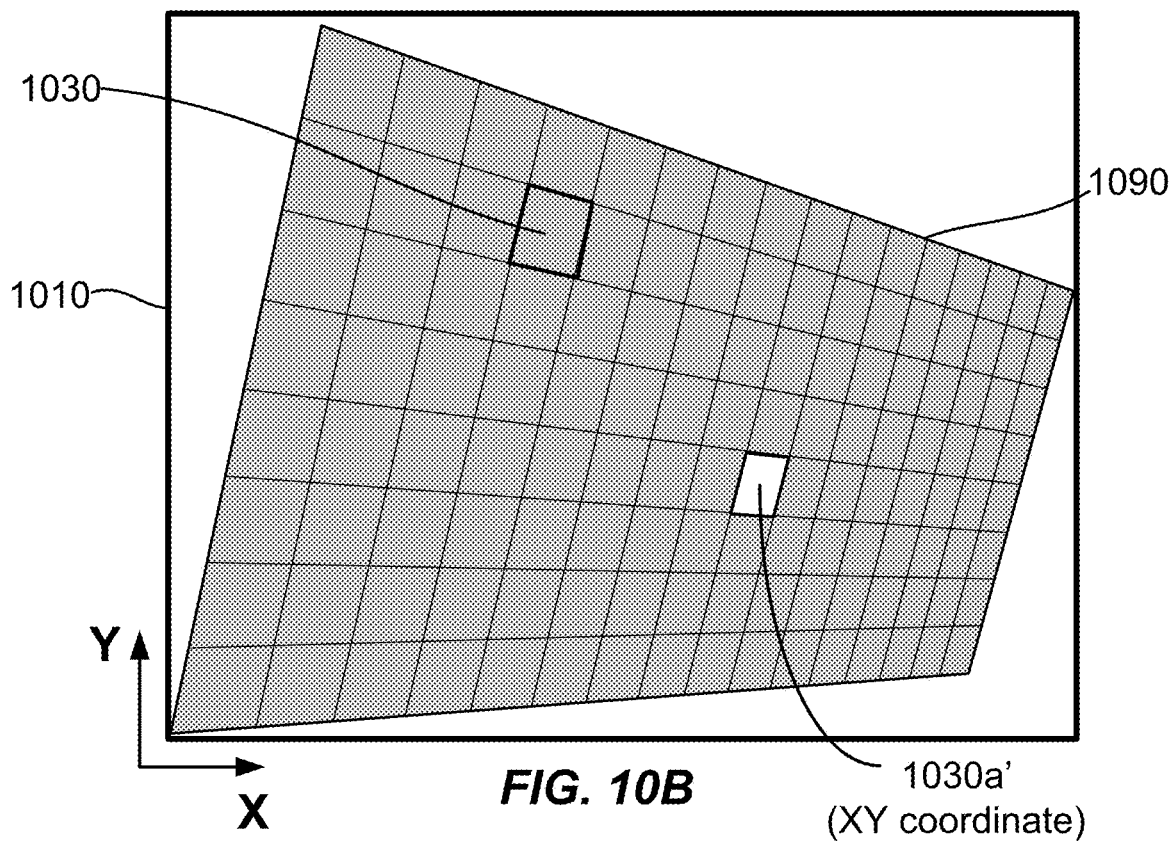

FIGS. 10A and 10B illustrate a method of rendering an image by ray tracing according to some embodiments. FIG. 10A shows a target screen 1090 in front of a virtual camera 1002. The target screen 1090 can be not perpendicular to the optical axis 1004 of the virtual camera 1002 (e.g., a normal 1092 of the target screen 1090 can form a non-zero angle with respect to the optical axis 1004 of the virtual camera 1002). FIG. 10B shows the target screen 1090 as viewed on a viewing frustum 1010 of the virtual camera 1002. The grids on the target screen 1090 represent the native pixels 1030 of the target screen 1090 (note that FIG. 10B is similar to FIG. 5A). A native pixel 1030 of the target screen 1090 can be referred herein as just a "pixel." It should be noted that, although FIG. 10A shows the target screen 1090 to be substantially flat, the target screen 1090 can be of any arbitrary shape, including those curved or warped (e.g., part of a spherical surface, part of a toroidal surface, or the like).

The process of acquiring color data for a given pixel along a given ray can be the same as in conventional rendering methods. The difference is how to determine which rays to sight down. For example, with reference to FIG. 5B, in a conventional rendering method, one ray per virtual pixel 540 can be traced; whereas in a new rendering method, with reference to FIG. 10B, one ray per native pixel 1030 can be traced.

Referring to FIG. 10A, for a given pixel 1030a on the target screen 1090, a ray 1040a can be traced from the virtual camera 1002 1010 through the pixel 1030a, toward a virtual scene. Color data for the pixel 1030a can be estimated based on incoming light from a virtual object in the virtual scene that the ray 1040a intersects. For example, the ray 1040a can intersect a ball 1050 in the virtual scene. The color data for the pixel 1030a can be estimated by light reflected and/or scattered by the ball 1050.

The position of each pixel 1030 on the target screen 1090 can be defined by a UV coordinate, as illustrated in FIG. 10A. To define a ray 1040a that originates from the virtual camera 1002 and passes through a given pixel 1030a on the target screen 1090 in the viewing frustum 1010 of the virtual camera 1002, the UV coordinate of the given pixel 1030a can be mapped into the XY coordinate of a corresponding point 1030a' on the viewing frustum 1010, as illustrated in FIG. 10B.

UV-XY mapping (maybe referred to as UV mapping) is a process of projecting a two-dimensional (2D) image onto a surface of a three-dimensional (3D) object. A non-planar surface of a 3D object can be considered as a warped 2D space. Each point on the surface of a 3D object can be defined by a UV coordinate. The UV axes can correspond to two orthogonal axes of the surface of the 3D object.

Figure 11A:
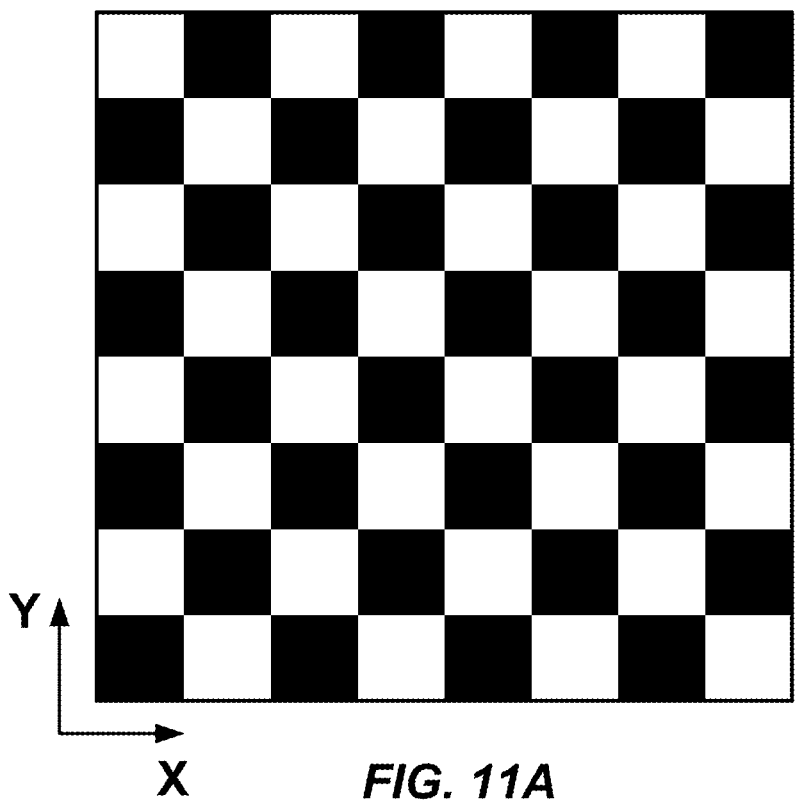
FIGS. 11A-11D illustrate UV-XY mapping.

FIGS. 11A-11D illustrate some examples of UV-XY mapping. FIG. 11A shows a square 2D image. It can be analogous to a rendered image that will be mapped onto a display screen. For the purpose of illustration, the 2D image shown in FIG. 11A is a simple checkered grid. Each point on the 2D image can be defined by an XY coordinate, where the X-axis is the horizontal axis, and the Y-axis is the vertical axis.

Figure 11B:
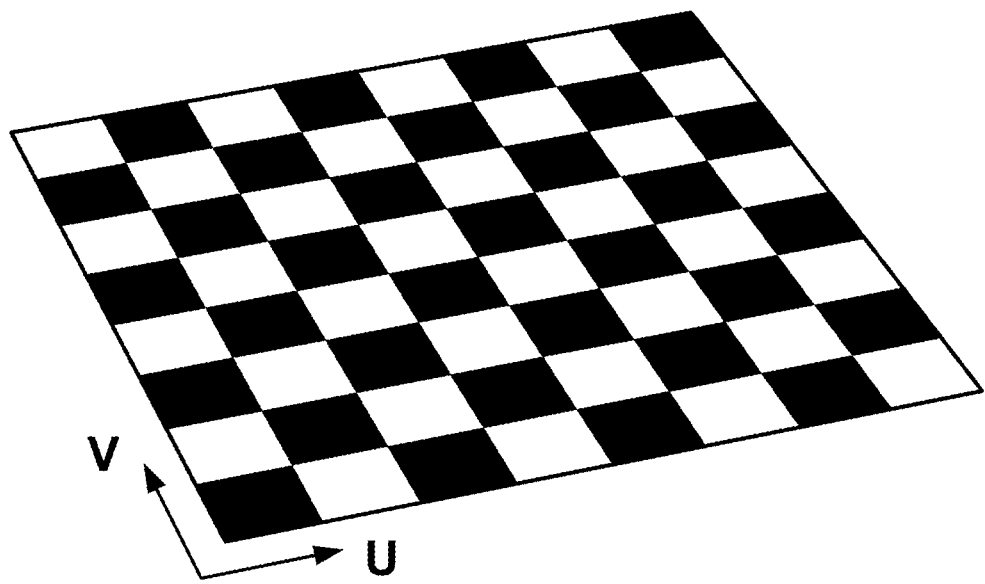
Figure 11C:
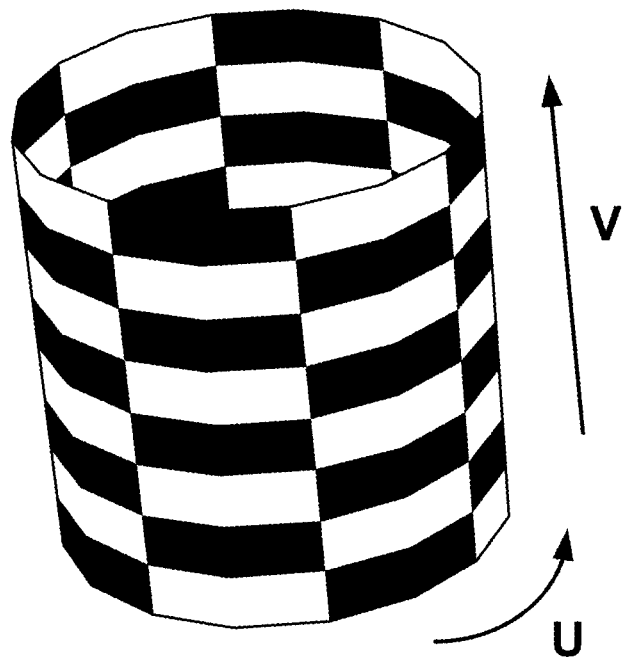
Figure 11D:
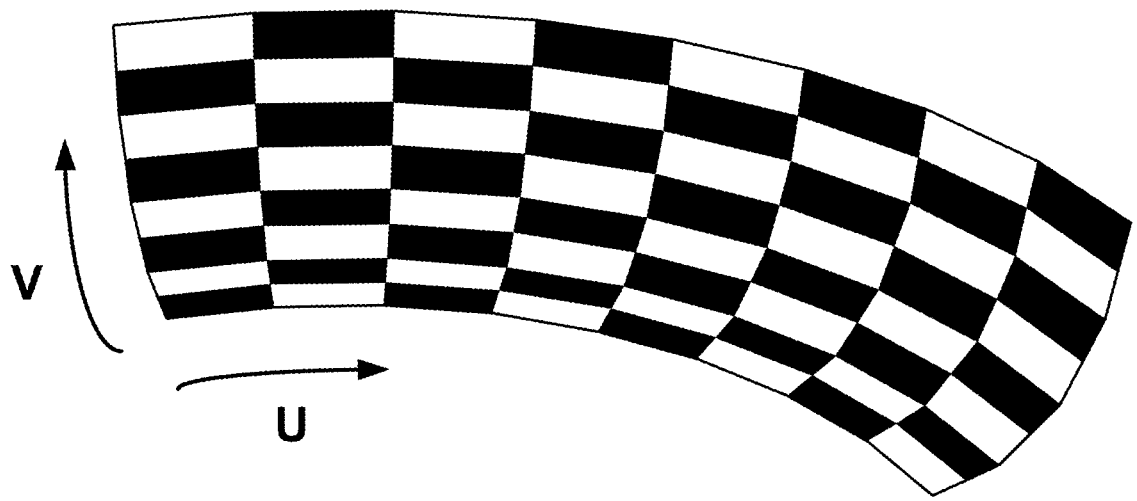

The 2D image shown in FIG. 11A can be mapped onto a surface of a 3D object. FIGS. 11B-11D show three different exemplary 3D surfaces: FIG. 11B shows a flat surface; FIG. 11C shows a cylindrical surface; and FIG. 11D shows an arbitrary surface that appears to be a warped surface. For the flat surface shown in FIG. 11B, the UV axes can be the two orthogonal axes along the two adjacent edges of the square. The UV mapping of the 2D image shown in FIG. 11A to the flat surface shown in FIG. 11B can be straightforward. For the cylindrical surface shown in FIG. 11C, the U axis can be along the circumference of the cylinder, and the V axis can be along the vertical direction. Mapping the 2D image shown in FIG. 11A onto the cylindrical surface shown in FIG. 11C can be analogous to wrapping a label onto the surface of a can. For the arbitrary curved surface shown in FIG. 11D, the 2D image shown in FIG. 11A can be "warped" to fit the curved surface.

Referring again to FIGS. 10A and 10B, to render an image directly in the native image space of the target screen 1090, for each respective pixel 1030a of the target screen 1090 with a respective UV coordinate, the XY coordinate of a corresponding point 1030a' on the viewing frustum 1010 of the virtual camera 1002 can be determined. The UV-XY mapping can be determined based on, for example, the position and orientation of the virtual camera 1002, and the position and orientation of the target screen 1090. Alternatively, the UV-XY mapping can be determined based on the position and the orientation of the target screen 1090 relative to the position and the orientation, respectively, of the virtual camera 1002.

In the ray tracing process, for each respective pixel 1030a of the target screen 1090, a ray can be launched from the virtual camera 1002 to a corresponding point 1030a' on the viewing frustum 1010 of the virtual camera 1002, using the UV-XY mapping. The color data estimated by tracing the ray is then assigned to the respective pixel 1030a on the target screen 1090. The rendered image can be projected onto a display screen corresponding to the target screen 1090, again using the UV-XY mapping. Thus, by rendering directly in the native image space of the target screen 1090, over-rendering (e.g., rendering in unused pixels, rendering at a higher pixel resolution than needed, and the like) can be avoided. Also, certain intermediate steps, such as resampling during projection, can be eliminated. Therefore, a final image with desired pixel resolution can be rendered in less time, fewer steps, and without resampling loss.

To achieve a higher quality image with less noise (e.g., a smoother image), multiple rays per pixel can be sampled. The color data estimated for the multiple rays sampled for a given pixel can be averaged (or by other statistical means) to obtain the color data for the given pixel. In some embodiments, the spatial dimension of a given pixel (e.g., the solid angle subtended by the given pixel with respect to the virtual camera) can be determined; then N samples can be randomly chosen in that spatial dimension.

The rendering techniques described above can also be useful for rendering images to be displayed on background screens (e.g., LED background screens) used in live-action shoots. For example, ray tracing can be performed directly for the pixels of a large LED screen, based on a hero camera's point view.

Figure 12:
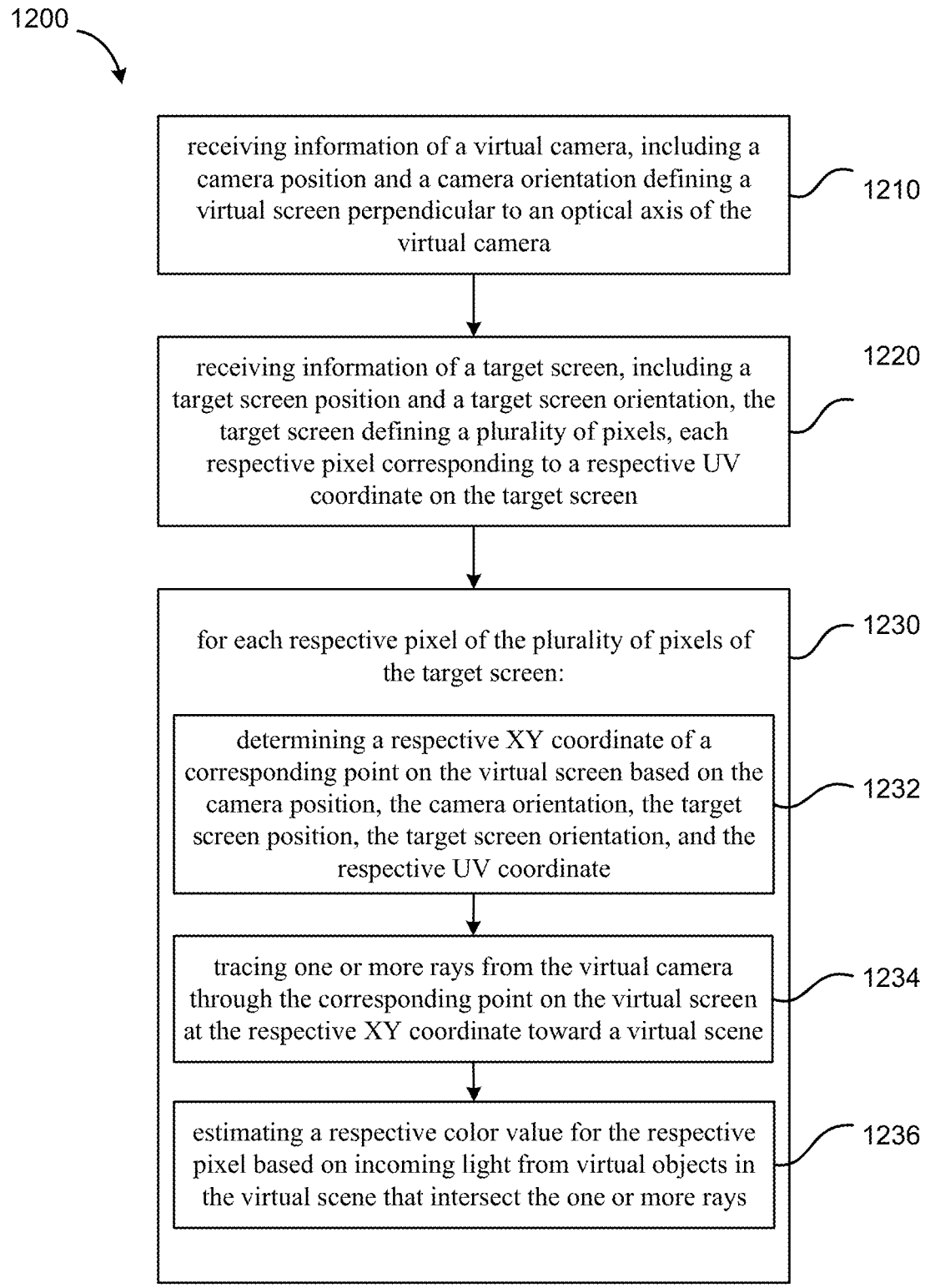
FIG. 12 shows a simplified flowchart illustrating a method of rendering an image for a display screen by ray tracing according to some embodiments.

FIG. 12 shows a simplified flowchart illustrating a method 1200 of rendering an image for a display screen by ray tracing according to some embodiments.

The method 1200 includes, at 1210, receiving information of a virtual camera. The information of the virtual camera can include a camera position and a camera orientation. The information of the virtual camera can define a virtual screen perpendicular to an optical axis of the virtual camera.

The method 1200 further includes, at 1220, receiving information of a target screen. The information of the target screen can include a target screen position and a target screen orientation. The target screen can define a plurality of pixels. For example, the pixels can be defined according to a desired pixel resolution. The information of the target screen can also include the geometry of the target screen. For example, the target screen can be substantially flat or can be curved. Points on the target screen may be defined in a UV coordinate system. Thus, each respective pixel can correspond to a respective UV coordinate on the target screen.

The method 1200 further includes, at 1230, performing the following for each respective pixel of the plurality of pixels of the target screen. At 1232, a respective XY coordinate of a corresponding point on the virtual screen is determined based on the camera position, the camera orientation, the target screen position, the target screen orientation, and the respective UV coordinate. For example, the respective XY coordinate can be determined using a UV-XY mapping. At 1234, one or more rays are traced from the virtual camera through the corresponding point on the virtual screen at the respective XY coordinate toward a virtual scene. At 1236, a respective color value for the respective pixel is estimated based on incoming light from virtual objects in the virtual scene that intersect the one or more rays.

According to the method 1200 illustrated in the flowchart of FIG. 12, ray tracing is performed directly for the pixels in the native image space of the target screen. This rendering technique can be advantageous for rendering images to be projected or displayed on non-standard display screens, for example in 3D rides and immersive environments used in virtual content production. It can eliminate certain intermediate steps (e.g., resampling from the virtual screen to the display screen, stitching together multiple sections of the display screen, and the like), save rendering cycles, eliminate wasteful renderings on unused pixels, and prevent generational losses.

It should be appreciated that the specific steps illustrated in FIG. 12 provide a particular method of rendering an image for a display screen by ray tracing according to some embodiments. Other sequences of steps can also be performed according to alternative embodiments. For example, alternative embodiments of the present invention can perform the steps outlined above in a different order. Moreover, the individual steps illustrated in FIG. 12 can include multiple sub-steps that can be performed in various sequences as appropriate to the individual step. Furthermore, additional steps can be added or removed depending on the particular applications. One of ordinary skill in the art would recognize many variations, modifications, and alternatives.

Figure 13:
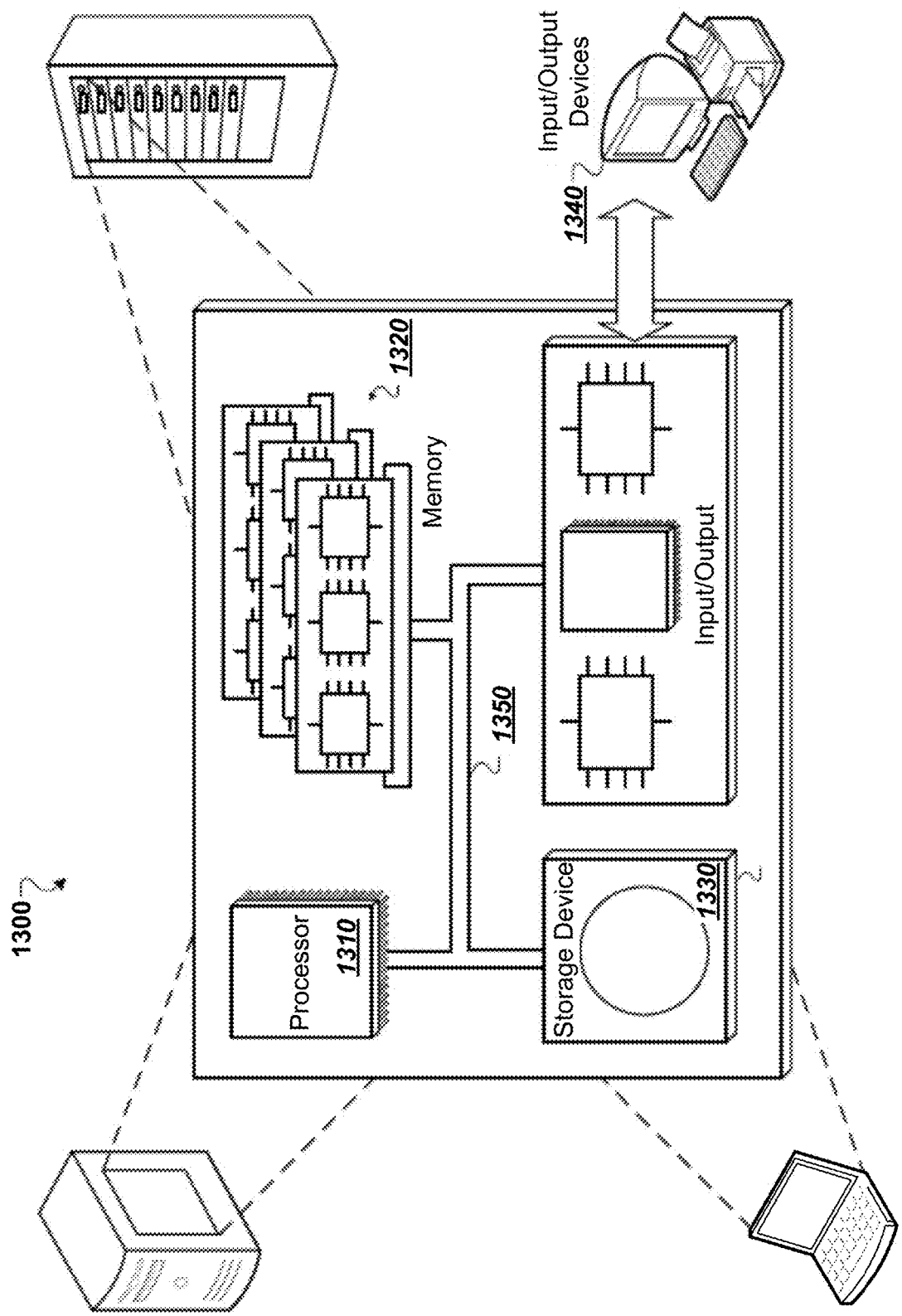
FIG. 13 shows a schematic diagram of an example of a computer system.

FIG. 13 shows a schematic diagram of an example of a computer system 1300. The computer system 1300 is exemplary only and one having skill in the art will recognize that variations and modifications are possible. The system 1300 can be used for the operations described in association with the processes of FIG. 12.

The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to perform the steps of processes according to the present invention.

The memory 1320 stores information within the system 1300 and can be associated with various characteristics and implementations. For example, the memory 1320 can include various types of computer-readable medium such as volatile memory, a non-volatile memory and other types of memory technology, individually or in combination.

The storage device 1330 is capable of providing mass storage for the system 1300. In one implementation, the storage device 1330 is a computer-readable medium. In various different implementations, the storage device 1330 can be a floppy disk device, a hard disk device, an optical disk device, or a tape device.

The input/output device 1340 provides input/output operations for the system 1300. In one implementation, the input/output device 1340 includes a keyboard, pointing device, touchscreen display, and/or the like. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system 1300 can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of rendering an image of a scene on a curved surface of a target screen by ray tracing, the method comprising:
   receiving information for a camera, including a camera position and a camera orientation defining a virtual screen perpendicular to an optical axis of the camera;
   receiving information of the target screen, including a target screen position and a target screen orientation, wherein points on the target screen are defined in a UV coordinate system and the target screen defines a plurality of pixels with each pixel in the plurality of pixels corresponding to a respective UV coordinate on the target screen; and
   rendering the image on the curved surface of the target screen by performing ray tracing for the plurality of pixels of the target screen to simulate lighting of the scene by tracing a path of light from a virtual camera through a two-dimensional viewing plane out into a three-dimensional scene and back to light sources for the scene, wherein performing ray tracing comprises sighting down one or more rays per pixel of the target screen by, for each respective pixel of the target screen having a respective UV coordinate:
      (i) determining a respective XY coordinate of a corresponding point on the virtual screen based on the camera position, the camera orientation, the target screen position, the target screen orientation, and the respective UV coordinate;
      (ii) tracing one or more rays from the camera through the pixel of the target screen towards a corresponding point on the virtual screen at the respective XY coordinate toward a virtual scene; and
      (iii) estimating a respective color value for the respective pixel based on incoming light from virtual objects in the virtual scene that intersect the one or more rays.

2. The method of claim 1, wherein a normal of the target screen forms a non-zero angle with respect to the optical axis of the camera.

3. The method of claim 1, wherein the target screen is curved.

4. The method of claim 3, wherein a normal of the target screen at a center of the target screen forms a non-zero angle with respect to the optical axis of the camera.

5. The method of claim 1, wherein the target screen partially fills a smallest viewing frustum of the camera that encompasses an entirety of the target screen.

6. The method of claim 1, wherein the target screen encompasses a field of view of the camera that is greater than 90 degrees.

7. The method of claim 1 wherein the target screen is part of an immersive content production system.

8. The method of claim 7 wherein the immersive content production system comprises a performance area that is at least partially surrounded by one or more curved light emitting diode display walls and a display ceiling that display a virtual environment and the target screen is on one or more of the light emitting diode display walls.

9. The method of claim 1 wherein estimating a respective color value for the respective pixel comprises averaging color value for the respective pixel.

10. The method of claim 9 wherein an angle to the camera from the target screen changes over time as the camera moves.

11. A computer product comprising a non-transitory computer readable medium storing a plurality of instructions that when executed control a computer system to render an image of a scene on a curved surface of a target screen by ray tracing, the instructions comprising:
   receiving information for a camera, including a camera position and a camera orientation defining a virtual screen perpendicular to an optical axis of the camera;
   receiving information of the target screen, including a target screen position and a target screen orientation, wherein points on the target screen are defined in a UV coordinate system and the target screen defines a plurality of pixels each pixel in the plurality of pixels corresponding to a respective UV coordinate on the target screen;
   rendering the image on the curved surface of the target screen by performing ray tracing for the plurality of pixels of the target screen to simulate lighting of the scene by tracing a path of light from a virtual camera through a two-dimensional viewing plane out into a three-dimensional scene and back to light sources for the scene, wherein performing ray tracing comprises sighting down one or more rays per pixel of the target screen by, for each respective pixel of the target screen having a respective UV coordinate of the plurality of pixels of the target screen:
      (i) determining a respective XY coordinate of a corresponding point on the virtual screen based on the camera position, the camera orientation, the target screen position, the target screen orientation, and the respective UV coordinate;
      (ii) tracing one or more rays from the camera through the pixel of the target screen towards a corresponding point on the virtual screen at the respective XY coordinate toward a virtual scene; and
      (iii) estimating a respective color value for the respective pixel based on incoming light from virtual objects in the virtual scene that intersect the one or more rays by averaging color value data for the respective pixel.

12. The computer product of claim 11, wherein a normal of the target screen forms a non-zero angle with respect to the optical axis of the camera.

13. The computer product of claim 11, wherein the target screen is curved.

14. The computer product of claim 13, wherein a normal of the target screen at a center of the target screen forms a non-zero angle with respect to the optical axis of the camera.

15. The computer product of claim 11, wherein the target screen partially fills a smallest viewing frustum of the camera that encompasses an entirety of the target screen.

16. The computer product of claim 11, wherein the target screen encompasses a field of view of the camera that is greater than 90 degrees.

17. A computer system comprising:
one or more processors; and
a non-transitory computer readable medium storing a plurality of instructions that when executed control the one or more processors to render an image of a scene by ray tracing for an immersive content production system the instructions comprising:
receiving information for a camera of the immersive content production system having a performance area that is at least partially surrounded by one or more curved light emitting diode display walls and a display ceiling that display virtual environment content, including a camera position and a camera orientation defining a virtual screen perpendicular to an optical axis of the camera;
receiving information of a target screen on the one or more curved light emitting diode display walls, including a target screen position and a target screen orientation, the target screen defining a plurality of pixels, each respective pixel corresponding to a respective UV coordinate on the target screen;
rendering the image by performing ray tracing for the plurality of pixels of the target screen to simulate lighting of the scene by tracing a path of light from a virtual camera through a two-dimensional viewing plane out into a three-dimensional scene and back to light sources for the scene, wherein performing ray tracing comprises sighting down one or more rays per pixel of the target screen by, for each respective pixel of the target screen having a respective UV coordinate of the plurality of pixels of the target screen:
(i) determining a respective XY coordinate of a corresponding point on the virtual screen based on the camera position, the camera orientation, the target screen position, the target screen orientation, and the respective UV coordinate;
(ii) tracing one or more rays from the camera through the pixel of the target screen towards a corresponding point on the virtual screen at the respective XY coordinate toward a virtual scene; and
(iii) estimating a respective color value for the respective pixel based on incoming light from virtual objects in the virtual scene that intersect the multiple rays by averaging color value data for the respective pixel, wherein an angle of the camera to the target screen changes over time as the camera moves.

18. The computer system of claim 17, wherein a normal of the target screen forms a non-zero angle with respect to the optical axis of the camera.

19. The computer system of claim 17, wherein the target screen is curved.

20. The computer system of claim 19, wherein a normal of the target screen at a center of the target screen forms a non-zero angle with respect to the optical axis of the camera.

21. The computer system of claim 17, wherein the target screen partially fills a smallest viewing frustum of the camera that encompasses an entirety of the target screen.

22. The computer system of claim 17, wherein the target screen encompasses a field of view of the camera that is greater than 90 degrees.

* * * * *